US012790946B2

(12) United States Patent
Iglesias Cano et al.

(10) Patent No.: US 12,790,946 B2
(45) Date of Patent: Nov. 10, 2026

(54) REINFORCEMENT FOR A COMPOSITE BLADE OF A TURBOMACHINE, COMPRISING A STACK OF PLIES

(71) Applicant: SAFRAN, Paris (FR)

(72) Inventors: Celia Iglesias Cano, Moissy-Cramayel (FR); Dominique Marie Christian Coupe, Moissy-Cramayel (FR); Nicolas Horter, Moissy-Cramayel (FR); Noemie Steenbakker, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/853,353

(22) PCT Filed: Mar. 30, 2023

(86) PCT No.: PCT/FR2023/050459
§ 371 (c)(1),
(2) Date: Oct. 1, 2024

(87) PCT Pub. No.: WO2023/187297
PCT Pub. Date: Oct. 5, 2023

(65) Prior Publication Data

US 2025/0215800 A1 Jul. 3, 2025

(30) Foreign Application Priority Data

Apr. 1, 2022 (FR) ....................................... 2202995

(51) Int. Cl.
*F01D 5/28* (2006.01)
*F01D 9/02* (2006.01)
*F01D 25/00* (2006.01)

(52) U.S. Cl.
CPC ............... *F01D 5/282* (2013.01); *F01D 9/02* (2013.01); *F01D 25/005* (2013.01); *F05D 2300/603* (2013.01)

(58) Field of Classification Search
CPC . F01D 9/00; F01D 9/02; F01D 25/005; F01D 5/28; F01D 5/282; F01D 5/284; F05D 2300/603
See application file for complete search history.

(56) References Cited

U.S. PATENT DOCUMENTS 6,666,651 B2 * 12/2003 Rust ........................ B64C 11/26 416/239
7,549,840 B2 * 6/2009 Subramanian .... C04B 35/62884 415/173.1
(Continued)

FOREIGN PATENT DOCUMENTS

EP 2 588 758 A1 4/2016
EP 3 026 216 A1 6/2016
(Continued)

OTHER PUBLICATIONS

'Humidity for Composites'. Condair. [online]. 2020, [retrieved on May 16, 2025]. Retrieved from the Internet: <https://web.archive.org/web/20200923162536/https://www.condair.com/humidifiers-for-composites> (Year: 2020).*
(Continued)

*Primary Examiner* — Elton K Wong
(74) *Attorney, Agent, or Firm* — Birch, Stewart, Kolasch & Birch, LLP

(57) ABSTRACT

The present application relates to a reinforcement for a blade of a turbomachine, the blade comprising a first outer skin and a second outer skin which are made of composite material and each comprise an inner end portion spaced apart from each other in such a way as to delimit therebetween an inner cavity of the blade that opens into an
(Continued)

opening, wherein the reinforcement is adapted to be arranged in the inner cavity in such a way as to close the opening, and wherein the reinforcement comprises a stack of plies that are superposed along a stacking direction corresponding to a thickness direction of the plies, at least two plies having different lengths and/or widths such that the reinforcement has a profile of variable dimensions.

18 Claims, 5 Drawing Sheets

(56) References Cited

U.S. PATENT DOCUMENTS

| | | | | |
|---|---|---|---|---|
| 9,616,629 | B2 | 4/2017 | Fabre et al. | |
| 10,914,176 | B2 | 2/2021 | Kamiya et al. | |
| 11,066,939 | B2 * | 7/2021 | Okabe | B29C 70/16 |
| 11,111,798 | B2 | 9/2021 | Lanfant et al. | |
| 12,030,616 | B2 | 7/2024 | Courtier et al. | |
| 2015/0344127 | A1 * | 12/2015 | Wood | B64C 11/18 415/119 |
| 2016/0333729 | A1 * | 11/2016 | Miller | F04D 27/0292 |
| 2017/0348876 | A1 * | 12/2017 | Lin | B32B 27/283 |
| 2018/0119549 | A1 * | 5/2018 | Vetters | F01D 5/147 |
| 2019/0301290 | A1 * | 10/2019 | Kamiya | B29C 70/70 |
| 2020/0011190 | A1 * | 1/2020 | Read | C04B 35/83 |
| 2020/0182073 | A1 * | 6/2020 | Courtier | B64C 11/26 |
| 2021/0108521 | A1 | 4/2021 | Okabe et al. | |

FOREIGN PATENT DOCUMENTS

| | | |
|---|---|---|
| FR | 3 063 514 A1 | 9/2018 |
| FR | 3 107 300 A1 | 8/2021 |

OTHER PUBLICATIONS

French Search Report issued for 2202996 on Jan. 4, 2022.

International Search Report issued for PCT/FR2023/050459 on Jul. 5, 2023.

* cited by examiner

REINFORCEMENT FOR A COMPOSITE BLADE OF A TURBOMACHINE, COMPRISING A STACK OF PLIES

TECHNICAL FIELD

The present application relates to aircraft turbomachines, in particular turbojet engines or turboprop. The application relates to a reinforcement for a composite turbomachine blade, a composite blade provided with such a reinforcement, and a method for manufacturing such a reinforcement and such a composite blade.

TECHNOLOGICAL BACKGROUND

An aircraft typically comprises at least one turbomachine to provide propulsion.

The turbomachine comprises at least one fan or propeller, at least one compressor, a combustion chamber, at least one turbine, and a gas exhaust nozzle. For example, the turbomachine may comprise a low-pressure compressor and a high-pressure compressor, and a high-pressure turbine and a low-pressure turbine. The high-pressure turbine rotates the high-pressure compressor via a high-pressure shaft, and the low-pressure turbine rotates the low-pressure compressor via a low-pressure shaft. The low-pressure turbine may also rotate the fan either directly via the low-pressure shaft or via a reduction gear arranged between the low-pressure turbine and the fan, the reduction gear being rotated by the low-pressure shaft.

The fan comprises a hub and blades secured to the hub, the fan blades being rotatable about a longitudinal axis of the turbomachine. A secondary flow rectifier may be arranged downstream of the fan. The rectifier comprises rectifier blades located downstream of the fan blades, the rectifier blades being stationary, that is to say being fixed in rotation relative to the longitudinal axis of rotation of the fan blades.

In a ducted turbomachine, or turbojet engine, the fan is housed in a fan casing, upstream of the rest of the turbomachine.

In an unducted turbomachine or turboprop (or Unducted fan or open rotor), the fan is an unducted propeller placed outside the nacelle, in the airflow surrounding the turbomachine. An unducted turbomachine may comprise two unducted and counter-rotating fans, or propellers (known as UDF for "Unducted Fan"), or alternatively an unducted single fan and a rectifier comprising several rectifier blades (known as USF for "Unducted Single Fan"). The fan may be placed at the rear of the gas generator so as to be of the pusher type or at the front of the gas generator so as to be of the tractor type. An unducted turbomachine allows to increase the bypass ratio very significantly without being penalized by the mass of the casings or nacelles intended to surround the fan vanes.

The turbomachine can be a dual-flow turbomachine, in which the air mass drawn in by the fan is divided into a primary flow, which passes through the at least one compressor, the combustion chamber and the at least one turbine, and a secondary flow, which is concentric with the primary flow. The bypass ratio of a turbomachine corresponds to the ratio between the primary flow rate and the secondary flow rate. Increasing the bypass ratio improves the performance of the turbomachine and reduces its specific fuel consumption. This results in an increase in the diameter of the blades at iso engine thrust, in particular the fan blades and the associated stator blades. This increase in dimensions is even more significant for unducted turbomachines, in which the blades are larger and the rotation speeds are lower. Increasing the dimensions of the blades results in an increase in the mass of the blades, in particular the stator blades, which is detrimental to the performance of the turbomachine.

In order to reduce the mass of the blades, the blades can be designed in organic matrix composite material comprising a fibrous reinforcement embedded in an organic matrix. Furthermore, the organic matrix can be partially hollow, reinforcing only the structural portions.

Known from the prior art, as illustrated in FIG. 1, is a rectifier blade 100 of a ducted turbomachine extending radially between an inner platform, by which the blade 100 is fixed to an inner casing of the turbomachine, and an outer platform, by which the blade 100 is fixed to an outer casing of the turbomachine. Each blade 100 comprises a vane body made of composite material consisting of a fiber reinforcement having a three-dimensional weave and densified by a matrix. The fiber reinforcement has an end portion comprising two segments 200 disconnected from each other up to a free end of the fiber reinforcement. The blade 100 further includes a gap filler or roving subcomponent in the form of an added insert 300 allowing to fill a free space at the junction between the segments 200 of the fiber reinforcement. The insert 300 may in particular be manufactured from a shaped braid. Document FR 3 063 514 A1 describes such a rectifier blade, the blade further comprising an added insert having a pi-shaped section. Thus, the blade may be manufactured from a solid composite material instead of metallic materials such as titanium, and the increase in the mass of the blade is reduced.

However, the insert does not meet the new geometric and structural constraints of a composite blade, in particular a 3D woven organic matrix composite blade of a secondary flow rectifier. Indeed, the evolution of the target geometry of the added insert, which must have a very significant thickness variation, makes its manufacture using known techniques, such as from a shaped braid, unfeasible.

Furthermore, in unducted turbomachines, fixing the blade, in particular the stator blade, to a casing of the turbomachine only by its inner radial end located at the blade root, has the consequence of transmitting all the forces in the blade root area, which results in high levels of stresses in the composite portions of the blade root. The known added inserts do not allow the blade root area to be sufficiently reinforced locally, and thus do not sufficiently limit the opening and the stresses at the disconnected segments of the fiber reinforcement under tensile, compressive and bending biasing. Furthermore, the known inserts manufactured from a braid have too low a rigidity and therefore do not allow the overall stiffness of the blade to be sufficiently increased, which results in an increased risk of buckling and a degradation of the frequency placement of the rectifier.

DISCLOSURE OF THE INVENTION

A purpose of the present application is to propose a reinforcement for a composite turbomachine blade allowing to reduce the stresses exerted on the blade at a structural area of the blade, and allowing to limit the increase in the mass of the blade.

Another purpose of the application is to propose a reinforcement for a composite turbomachine blade having a complex geometry and satisfactory mechanical resistance properties.

Another purpose of the application is to propose a method for manufacturing such a reinforcement which allows to quickly create a reinforcement having a complex geometry.

For this purpose, according to a first aspect, provision is made of a reinforcement for a blade of a turbomachine, the blade comprising a first outer skin and a second outer skin which are made of composite material connected to each other at an outer end of the blade, the first skin comprising a first inner end portion, the second skin comprising a second inner end portion, the first inner end portion and the second inner end portion being spaced apart from each other in such a way as to delimit therebetween an inner cavity of the blade that opens into an opening at an inner end of the blade, the inner end being radially opposite the outer end, wherein the reinforcement is adapted to be arranged in the inner cavity in such a way as to close the opening, and wherein the reinforcement comprises a stack of plies, each ply having a length, a width and a thickness, a ply being superposed on an adjacent ply along a stacking direction corresponding to a thickness direction of the plies, at least two of the plies of the stack having different lengths and/or widths such that the reinforcement has a profile of variable dimensions.

Optionally, the stack of plies of the reinforcement may comprise a first ply having a first length and a second ply having a second length strictly less than the first length, and:

- the second ply may be arranged closer to a center of the reinforcement than the first ply, the stacking direction being adapted to correspond to a thickness direction of the blade, or
- the first ply may be adapted to be arranged closer to the inner end of the blade than the second ply when the reinforcement is arranged in the inner cavity of the blade, the stacking direction being adapted to correspond to a height direction of the blade.

According to a second aspect, the present application relates to a blade of a turbomachine, comprising a first outer skin and a second outer skin which are made of composite material connected to each other at an outer end of the blade, the first skin comprising a first inner end portion, the second skin comprising a second inner end portion, the first inner end portion and the second inner end portion being spaced apart from each other in such a way as to delimit therebetween an inner cavity of the blade that opens into an opening at an inner end of the blade, the inner end being radially opposite the outer end, the blade further comprising a reinforcement according to the first aspect, the reinforcement having dimensions corresponding substantially to dimensions of the inner cavity at the opening, the reinforcement being arranged in the inner cavity in such a way as to close the opening.

Some preferred but non-limiting features of the blade according to the second aspect are the following, taken individually or in any technically conceivable combination:

- the blade comprises an aerodynamically profiled vane suitable for being placed in an airflow when the turbomachine is operating in order to generate lift, and a root configured to be fixed to the hub of a blading comprising the blade at the inner end of the blade, the first inner end portion and the second inner end portion being adapted to together define outer walls of the root and of at least a portion of the vane of the blade, such that the inner cavity comprises a root portion and a vane portion, and the reinforcement comprising a root portion arranged in the root portion of the inner cavity and a vane portion arranged in the vane portion of the inner cavity;
- the blade further comprises a filling material arranged in the inner cavity radially between the reinforcement and the outer end of the blade.

According to a third aspect, the present application relates to an unducted turbomachine, comprising:

- a casing;
- a fan having a fan hub and peripheral fan vanes, integral with the fan hub, the fan hub having a downstream hub portion which is surrounded by an inner surface of an upstream portion of the casing and which projects beyond the upstream portion of the casing, the fan hub being rotatably mounted relative to the upstream portion of the casing about the longitudinal axis; and
- at least one rectifier blade according to the second aspect, said blade being located downstream relative to the peripheral fan vanes, said blade being mounted on an outer surface of the upstream portion of the casing at an inner end of the blade, the reinforcement being arranged at the inner end of the blade.

According to a fourth aspect, the present application relates to a method for manufacturing a reinforcement according to the first aspect for a blade of a turbomachine, comprising the following steps:

- E1: Cutting a set of plies in a carbon mat, each ply having a length, a width and a thickness, at least two of the plies of the set having different lengths and/or widths;
- E3: Stacking the plies of the set by superimposing a ply on an adjacent ply along a thickness direction of the plies, so as to create a stack having a profile of variable dimensions; and
- E4: Compacting the stack of plies.

Optionally, the method may further comprise the following steps:

- E2: Humidifying the plies after the cutting step E1 and before the stacking step E3; and
- E5: Drying the stack of compacted plies during step E4;

Optionally, the plies may be stacked during step E3 in a forming mold, the plies may be compacted during step E4 in the forming mold, and the method may further comprise a step E6 of cold demolding the compacted stack of plies.

According to a fifth aspect, the application relates to a method for manufacturing a blade of a turbomachine according to the second aspect, comprising the following steps:

- Producing a composite preform of the composite blade, said preform comprising a first outer skin and a second outer skin which are made of composite material connected to each other at an outer end of the blade, the first skin comprising a first inner end portion, the second skin comprising a second inner end portion, the first inner end portion and the second inner end portion being spaced apart from each other in such a way as to delimit therebetween an inner cavity of the blade that opens into an opening at an inner end of the blade, the inner end being radially opposite the outer end;
- Producing a reinforcement by means of a method according to the fourth aspect, the reinforcement having dimensions substantially equal to dimensions of the inner cavity at the opening;
- Placing the reinforcement in the inner cavity of the blade preform in such a way as to close the opening; and
- Injecting resin into the assembly comprising the blade preform and the reinforcement.

DESCRIPTION OF THE FIGURES

Other features, purposes and advantages will emerge from the following description, which is purely illustrative and not limiting, and which must be read in conjunction with the appended drawings in which.

DETAILED DESCRIPTION

Turbomachine

Figure 1:
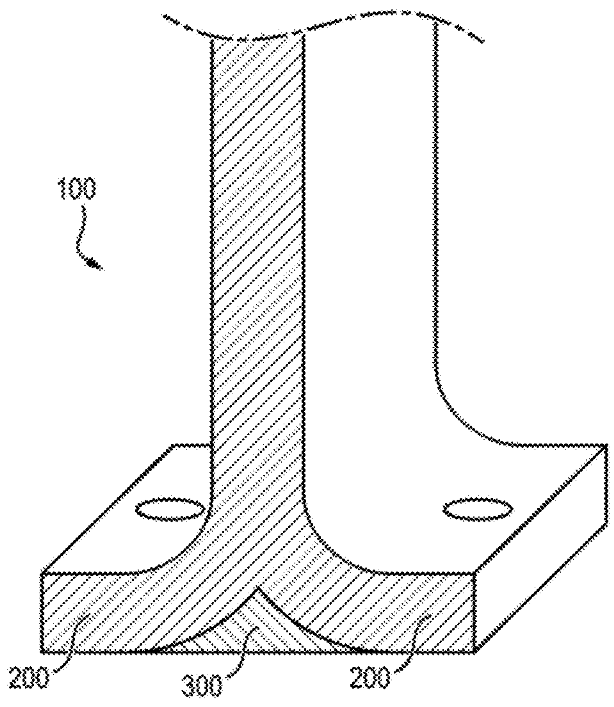
FIG. 1 illustrates a schematic perspective sectional view of a blade according to the prior art.

In the present application, upstream and downstream are defined relative to the normal flow direction of the gas through the fan 200 of the turbomachine 100, an airflow flowing in the turbomachine 100 from upstream to downstream. The longitudinal axis X corresponds to an axis of rotation of the fan 200. A radial axis is an axis perpendicular to the longitudinal axis X and passing therethrough. A longitudinal, respectively radial direction corresponds to the direction of the longitudinal, respectively radial axis X. The terms inner and outer, respectively, are used with reference to a radial direction such that the inner portion or face of an element is closer to the longitudinal axis X than the outer portion or face of the same element. A width direction L of the blade 1 corresponds substantially to the longitudinal direction, a height direction R of the blade 1 corresponds to the radial direction at the blade 1, and a thickness direction Y of the blade 1 corresponds to the direction perpendicular to the width direction L and the height direction R of the blade 1.

The turbomachine 100 extends substantially around the longitudinal axis X. The turbomachine 100 comprises, from upstream to downstream in the direction of gas flow, at least one fan 200, or propeller, an engine assembly 300 comprising at least one compressor, a combustion chamber and at least one turbine, and a gas exhaust nozzle 108. For example, the engine assembly 300 of the turbomachine 100 may comprise a fan and a rectifier, a low-pressure compressor and a high-pressure compressor, the combustion chamber, and a high-pressure turbine and a low-pressure turbine. The high-pressure turbine rotates the high-pressure compressor via a high-pressure shaft extending along the longitudinal axis X. The low-pressure turbine rotates the low-pressure compressor via a low-pressure shaft extending along the longitudinal axis X. The low-pressure turbine can also rotate the fan 200 either directly via the low-pressure shaft or via a reduction gear arranged between the low-pressure turbine and the fan 200, the reduction gear being rotated by the low-pressure shaft.

Each compressor and each turbine may include one or more stages, each stage being formed by a set of fixed blades, or stator blading, and a set of rotating blades, or rotor blading. The fixed blades are fixed to a casing 101 of the turbomachine 100. The rotating blades of the low-pressure compressor and the low-pressure turbine are fixed to the low-pressure shaft. The rotating blades of the high-pressure compressor and the high-pressure turbine are fixed to the high-pressure shaft.

In operation, air flows through the rotating fan 200 and a first portion, called the primary flow, of the airflow is routed through the low-pressure compressor and the high-pressure compressor, the primary flow being compressed and then sent to the combustion chamber. The hot combustion products from the combustion chamber are used to drive the high-pressure turbine and the low-pressure turbine and thus produce the thrust of the turbomachine 100, and are discharged through the nozzle 108 located downstream of the engine assembly 300. A second portion of the air, called the secondary flow, is discharged from the rotating fan 200 around the casing 101 from upstream to downstream.

A blade 1 is a structural part of the turbomachine 100, intended to be integrated into a blading of the turbomachine 100. The blading comprises a hub which can be rotatably mounted relative to the casing 101 of the turbomachine 100 for a rotating blading, or be fixedly mounted relative to the casing 101 of the turbomachine 100 for a fixed blading. The blading further comprises a plurality of blades 1 fixed to the hub. The blades 1 extend substantially radially relative to the longitudinal axis X and can be distributed circumferentially around the longitudinal axis X.

The blading may have, for example, a diameter greater than or equal to 150 cm, preferably greater than or equal to 200 cm, for example less than or equal to 400 cm. Thus, the blade 1 has a sufficient span so that the blades 1 of the blading comprise two outer skins 2, 3 made of a composite material and delimiting an inner cavity 4. A blade 1 of the blading thus preferably has a height greater than or equal to 50 cm, preferably greater than or equal to 70 cm, for example of the order of 80 cm to 100 cm, being for example less than or equal to 160 cm.

Figure 6:
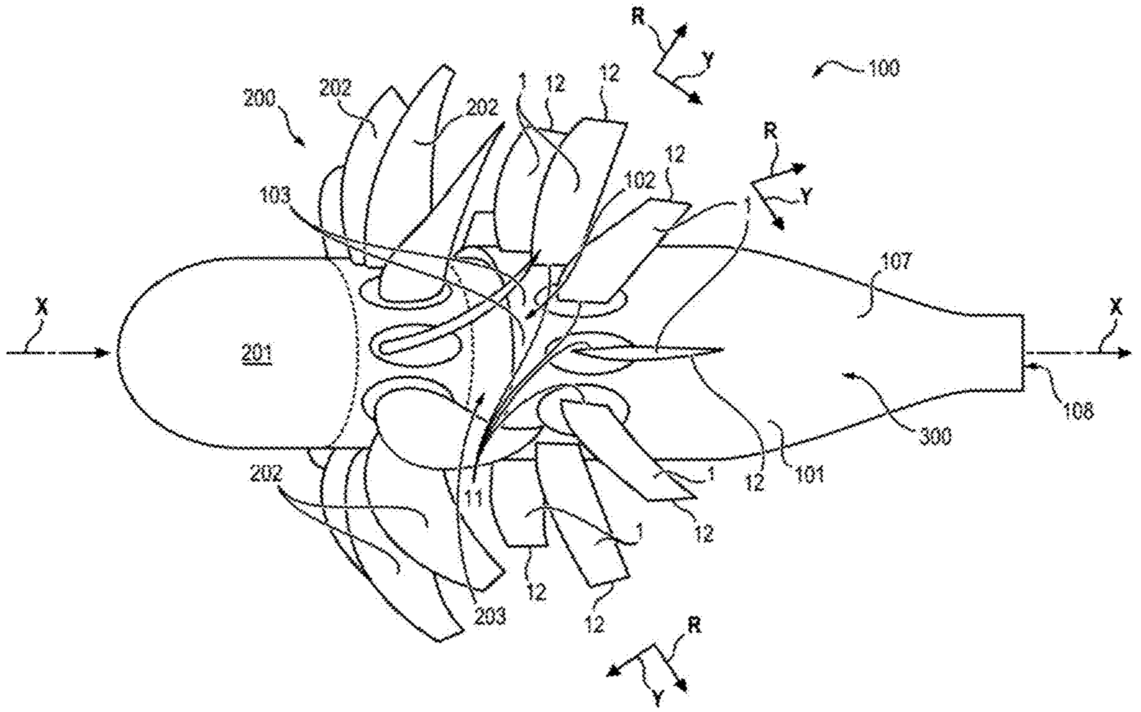
FIG. 6 illustrates a schematic perspective view of an example of an unducted turbomachine comprising a blade according to one embodiment.

FIG. 6 illustrates a non-limiting example in which the turbomachine 100 is an unducted turbomachine whose rectifier comprises a blade 1 comprising a reinforcement 6 according to a particular embodiment. The turbomachine 100 comprises:

- a casing 101;
- a fan 200 having a hub 201 of the fan 200 and peripheral vanes 202 of the fan 200, integral with the hub 201 of the fan 200, the hub 201 of the fan 200 having a downstream portion 203 of the hub 201 which is surrounded by an inner surface 102 of an upstream portion 103 of the casing 101 and which protrudes from the upstream portion 103 of the casing 101, the hub 201 of the fan 200 being rotatably mounted relative to the upstream portion 103 of the casing 101 about the longitudinal axis X; and
- at least one rectifier blade 1, said blade 1 being located downstream relative to the peripheral vanes 202 of the fan 200, said blade 1 being mounted on an outer surface of the upstream portion 103 of the casing 101 at an inner end of the blade 1, said blade 1 comprising a reinforcement 6 as described below, the reinforcement 6 being arranged at the inner end of the blade 1.

The casing 101 of the turbomachine 100 carries the fan 200 on its upstream side. The peripheral vanes 202 of the fan 200 are distributed on the hub 201 of the fan 200 around the longitudinal axis X of rotation upstream of the casing 101 of the turbomachine 100. The hub 201 of the fan 200 is able to rotate on itself relative to the upstream portion 103 of the casing 101 around the longitudinal axis X. The turbomachine 100 includes downstream of the hub 201 of the fan 200 and in the casing 101 a motor assembly 300 allowing to rotate the hub 201 of the fan 200 and therefore the peripheral vanes 202 of the fan 200 around the longitudinal axis X.

The rectifier blades 1 are located in the flow space of the secondary flow, which is created downstream of the peripheral vanes 202 of the fan 200 around the outer surface of the casing 101, when the peripheral vanes 202 of the fan 200 are rotated about the longitudinal axis X.

The turbomachine 100 being unducted, each secondary flow rectifier blade 1 is fixed or mounted in a movable manner on an outer surface of the upstream portion 103 of the casing 101, only at an inner end 11 of the blade. An outer end 12 of the blade 1, which is radially opposite relative to the inner end 11, is left bare in the secondary flow, without being mounted or fixed to a casing, no casing or nacelle surrounding the rectifier blades 1 and the casing 101.

The engine assembly 300 is located in the casing 101. An air inlet is located between the upstream portion 103 of the casing 101 and the hub 201 of the fan 200 and downstream of the peripheral vanes 202 of the fan 200. The rectifier blade 1 has a shape configured to concentrate the secondary flow against the outer surface of the downstream portion 107 of the casing 101, located downstream of the outer surface of the upstream portion 103 of the casing 101. An outer attachment arm or an outer attachment means connects the casing 101 to an aircraft.

It is understood that the reinforcement 6 may be a reinforcement 6 for a blade 1 of a turbomachine 100 of any type, for example of an unducted turbomachine 100, for example of a UDF type open rotor comprising two unducted and counter-rotating fans, or of a USF type open rotor comprising an unducted single fan and a rectifier. Alternatively, the reinforcement 6 may be a reinforcement 6 for a blade 1 of a ducted turbomachine 100, for example of a turbojet engine comprising a ducted fan 200.

Furthermore, it is understood that the reinforcement 6 may be a reinforcement 6 for any composite blade 1 of a turbomachine 100 requiring a thick reinforcement 6 or a geometry with progressive thickness, in particular for a partially hollow organic matrix composite blade 1 having a structural hollow area to be reinforced. Thus, the reinforcement 6 may be a reinforcement 6 for a composite blade 1 of any blading of a turbomachine 100, for example a reinforcement 6 for a fan 200, rectifier, compressor, and/or turbine blade 1.

Blade

A blade 1 comprises an aerodynamically profiled vane 13 suitable for being placed in an airflow when the turbomachine 100 is operating in order to generate lift, and a root 14 configured to be fixed to the rotating or fixed hub of the blading comprising the blade 1 at the inner end 11 of the blade 1. The inner end 11 of the blade 1 thus corresponds to the mounting side of the blade 1.

Figure 5:
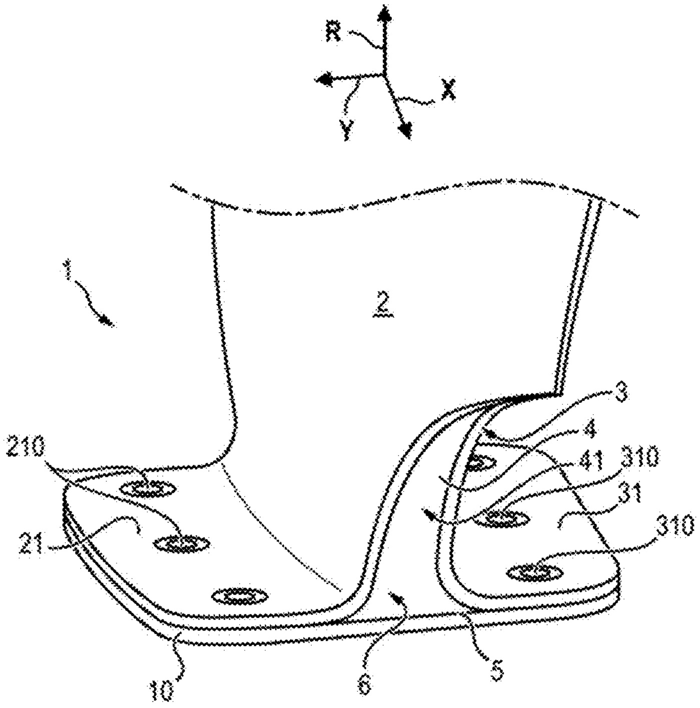
FIG. 5 illustrates a partial schematic perspective view of a blade according to one embodiment.

The root 14 of the blade 1 may be fixed to the hub, which is fixed or rotating, of the blading, by a fastener receiving the root 14 of the blade 1 and fixing it to the hub of the blading. FIG. 5 illustrates by way of non-limiting example an example of a fastener comprising holes 210, 310 respectively passing through the first inner end portion 21 and the second inner end portion 31 in the radial direction R, and may comprise bolting or riveting in the holes, or the like.

The root 14 of the blade 1 corresponds to the portion of the blade 1 which is located under a line Fs delimiting the flow space of the secondary flow of the turbomachine 100, or secondary flow line Fs. Thus, the root 14 of the blade 1 is located in a radially inner position relative to a wall of the casing 101 of the turbomachine 100 which radially delimits the flow space of the secondary flow on the inside. In a ducted turbojet engine 100, the flow space of the secondary flow is a flow path of the secondary flow delimited on the inside by the wall of the casing 101, the casing 101 corresponding to an inner casing, and delimited on the outside by a wall of an outer casing of the turbojet engine 100. In an open rotor 100, the flow space of the secondary flow is a space external to the open rotor 10, which is delimited on the inside by the wall of the casing 101.

The wall of the casing 101 may be formed of one or a set of inter-blade platforms 1. The inter-blade platforms 1 may be formed integrally with the blades 1 or be separated and attached to the blades 1 of a blading at a junction between the root 14 of the blade 1 and the vane 13. The inter-blade platforms 1 delimit, on the inside, the flow space of the secondary flow at the blading.

The aerodynamically profiled vane 13 has a leading edge 8 and a trailing edge 9 connected by a pressure side wall and a suction side wall. The leading edge 8 of the vane 13 forms an upstream end of the vane 13 in the flow space. It corresponds to the front portion of an aerodynamic profile that faces the airflow and divides the airflow into a pressure side flow and a suction side flow. The leading edge 8 of the vane 13 is configured to extend opposite the flow of gases entering the turbomachine 100. The trailing edge 9 of the vane 13 corresponds to the rear portion of the aerodynamic profile, where the pressure side and suction flows meet, and forms a downstream end of the vane 13 in the flow space.

The blade 1 comprises a first outer skin 2 and a second outer skin 3 which are made of composite material, connected to each other at the outer end 12 of the blade 1. The first skin 2 and the second skin 3 extend generally opposite each other. The first skin 2 can form the pressure side wall of the vane 13 and the second skin 3 can form the suction side wall of the vane 13. The skins 2 and 3 form the outer surface of the blade 1, located in the secondary airflow during operation of the turbomachine 100. The first skin 2 and the second skin 3 carry the leading edge 8 and the trailing edge 9 of the blade 1.

The first skin 2 and the second skin 3 of the blade 1 are made of a composite material comprising a fibrous reinforcement densified by a matrix. The skins 2, 3 may be monolithic and be made in one piece from a fibrous preform with a changing thickness. Alternatively, the fibrous reinforcement may comprise a first skin 2 and a second skin 3, which are connected for example near the outer end 12 of the blade 1. The fibrous reinforcement comprises a vane portion intended to form the aerodynamically profiled vane 13, and a root portion intended to form the root 14 of the blade 1.

The fibrous reinforcement may comprise woven or knitted three-dimensional fibrous arrangements. It is further made such that it comprises strands (that is to say any type of thread(s)) that extend continuously both inside the vane 13 portion and inside the root 14 portion of the blade 1. Alternatively, the fibrous reinforcement may comprise laminated two-dimensional fibrous arrangements. The fibers of the fibrous reinforcement comprise at least one of the following materials: carbon (typically silicon carbide), glass, aramid, polypropylene and/or ceramic (typically an oxide ceramic). The matrix typically comprises an organic matrix (thermosetting, thermoplastic or elastomeric) or a carbon matrix. For example, the matrix comprises a plastic material, typically a polymer, for example epoxy, bismaleimide or polyimide.

The first skin 2 comprises a first inner end portion 21 and the second skin 3 comprises a second inner end portion 31. The first inner end portion 21 and the second inner end portion 31 are spaced apart from each other in such a way as to delimit therebetween an inner cavity 4 of the blade 1 that opens into an opening 5 at an inner end 11 of the blade 1, the inner end 11 being radially opposite the outer end 12.

The inner end 11 of the blade 1 corresponds to a mounting end of the first skin 2 and the second skin 3 on a rotating or fixed hub of the blading comprising the blade 1. The blade 1 may be fixed to the rotating or fixed hub of the blading at its only inner end 11, in particular in the case of an unducted turbomachine 100, or at both its inner end 11 and its outer end 12, in particular in the case of a ducted turbomachine 100.

A height of the blade 1 corresponds to a distance along the radial axis between the inner end 11 and the outer end 12 of the blade 1. The outer end 12 of the blade 1 corresponds to a tip of the blade 1. A height of the vane 13 corresponds to a distance along the radial axis between an inner end and an outer end of the vane 13. A height of the root 14 corresponds to a distance along the radial axis between an inner end and an outer end of the root 14. The outer end 12 of the blade 1 corresponds to the outer end of the vane 13, and the inner end 11 of the blade 1 corresponds to the inner end of the root 14. The inner end of the vane 13 may correspond to the outer end of the root 14.

The skins 2, 3 of the fiber reinforcement are separated by the inner cavity 4 which is open at the inner end of the blade 1, which allows to further reduce the mass of the blade 1 in comparison with a conventional blade 1. In the case where the skins 2, 3 are obtained by three-dimensional weaving and are monolithic, the inner cavity 4 is obtained by creating a disconnection in the fiber reinforcement between two successive warp layers, from a so-called non-disconnected area (here comprising the head 12 of the blade 1) to the inner end 11 of the skins 2, 3, where the inner cavity 4 opens at the opening 5. For this purpose, at the disconnection, the warp strands of two successive layers of the fiber blank are not connected by weft strands. Preferably, the disconnection extends within the aerodynamically profiled vane 13 and extends to the inner end of the root 14 of the blade 1.

In the vane portion of the fiber reinforcement, the inner cavity 4 is not open on the leading edge 8 or the trailing edge 9. The portions of the fiber reinforcement forming the leading edge 8 and the trailing edge 9 are therefore not disconnected. The leading edge 8 and/or the trailing edge 9 may be attached and fixed to the fiber reinforcement, as described below concerning the method for manufacturing the blade 1. On the other hand, in the root portion of the fiber reinforcement, the inner cavity 4 may be open on the upstream and downstream edges of the root 14 of the blade 1, which extend in the extension of the leading edge 8 and the trailing edge 9 of the vane 13, respectively. The portions of the fiber blank forming the upstream edge and the downstream edge of the root 14 of the blade 1 may therefore be disconnected.

Reference may be made, for example, to document EP2588758 in the name of the Applicant for more details on the production of disconnections.

The first inner end portion 21 and the second inner end portion 31 correspond to the portions of the skins 2, 3, which are located in a radially inner position relative to the disconnection made in the fiber reinforcement. The first inner end portion 21 and the second inner end portion 31 may extend over the entire height of the root 14 of the blade 1 and over at least a portion of the height of the vane 13 of the blade 1, or even over substantially the entire height of the vane 13 of the blade 1 when the disconnection is located substantially at the outer end 12 of the blade 1. Thus, the first inner end portion 21 and the second inner end portion 31 are adapted to together define outer walls of the root 14 and of at least a portion of the vane 13 of the blade 1, such that the inner cavity 4 comprises a root portion and a vane portion. The inner cavity 4 thus extends over the entire height of the root 14 of the blade 1, and over at least a portion of the height of the vane 13, or even over substantially the entire height of the vane 13.

The first skin 2 and the second skin 3 can move away 101 from each other towards the inner end 11 of the blade 1 along the thickness direction Y of the blade 1. The inner cavity 4 is located in a radially outer position relative to the opening 5 and thus has a maximum thickness at the opening 5, that is to say at the inner end 11 of the blade 1.

A plate 10 may be fixed under and against the first inner end portion 21 and the second inner end portion 31 and be located under and against the opening 5 and the reinforcement 6. The plate 10 allows to make a connection between the first inner end portion 21 and the second inner end portion 31.

The blade 1 may be a variable-pitch rectifier blade. The rectifier comprises a hub fixedly mounted relative to the casing 101 of the turbomachine 100, and is therefore non-rotating. The stator blades 1 extend substantially radially relative to the longitudinal axis X. The blade 1 then comprises an actuating mechanism for modifying the pitch angle of the blade in order to adapt the performance of the turbomachine 100 to the different flight phases. In addition, each blade 1 comprises a fastener, or pivot, arranged at the root 14 of the blade 1. The fastener is rotatably mounted relative to the hub around the pitch axis. More precisely, the fastener is rotatably mounted inside a housing provided in the hub, by means of balls or other rolling elements. Thus, each root 14 of the rectifier blade 1 is pivotally mounted along a pitch axis and connected to a pitch change system mounted in the turbomachine 100.

Reinforcement

Figure 2:
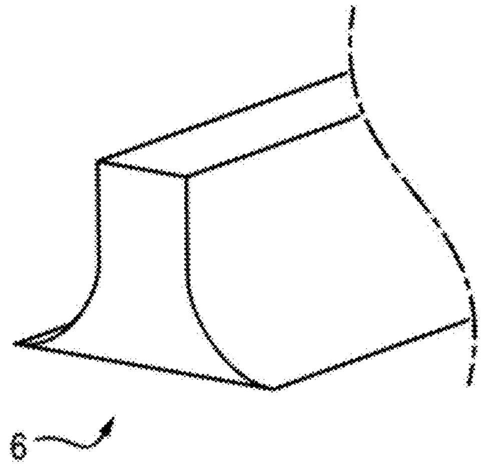
FIG. 2 illustrates a schematic perspective view of a reinforcement according to one embodiment, the reinforcement having a second geometry different from the first geometry.

A reinforcement 6 (or "Spar filler"), illustrated as a non-limiting example in FIG. 2, is a sub-component of the blade 1. The reinforcement 6 is adapted to be arranged in the inner cavity 4 in such a way as to close the opening 5. Furthermore, the reinforcement 6 helps to form and/or compact the three-dimensionally woven skins.

Figure 3A:
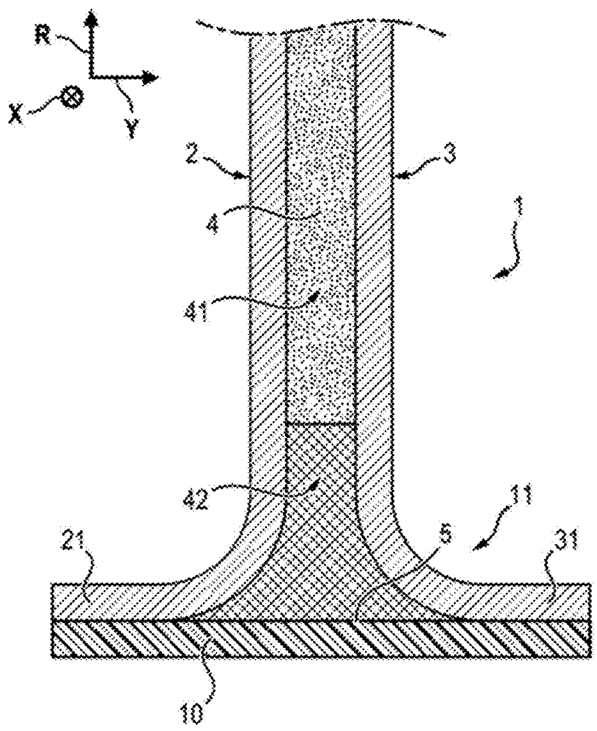
FIG. 3*a* illustrates a schematic radial cross-sectional view of a blade according to one embodiment.
Figure 3B:
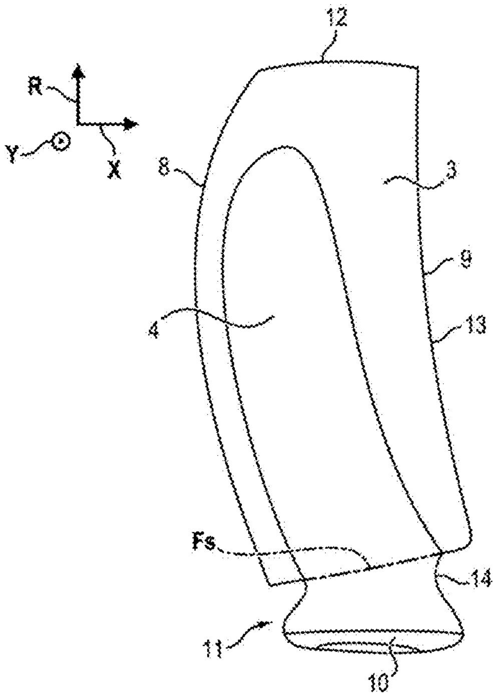
FIG. 3*b* illustrates a schematic radial longitudinal sectional view of a blade according to one embodiment.

As illustrated by way of non-limiting example in FIG. 3*a* and FIG. 3*b*, the reinforcement 6 comprises a stack of plies 61, each ply 61 having a length Pl, a width PL and a thickness Pe, a ply 61 being superposed on an adjacent ply 61 along a stacking direction De corresponding to a thickness direction Pe of the plies 61. At least two of the plies 61 of the stack have different lengths Pl and/or widths PL such that the reinforcement 6 has a profile of variable dimensions.

The reinforcement 6 described above allows to fill the opening 5 between the first inner end portion 21 and the second inner end portion 31, to correctly form the 3D woven skins and to provide improved mechanical strength once the part has polymerized, in particular bending stiffness, at the inner end 11 of the blade 1 which is an area where the stresses are greatest. The reinforcement 6 therefore allows a satisfactory compromise between stiffness and mass to improve the mechanical strength of the blade 1, for example compared to the addition of a spar or compared to an increase in the thickness of the composite outer skins 2, 3. The stiffening of the area located at the inner end 11 of the blade 1 allows to reduce the stresses in the composite outer skins 2, 3 compared to a solution whose cavity would be filled only with foam or provided with an insert as described in document FR 3 063 514 A1. The increase in stiffness also allows to limit the movement of the outer end 12 of the blade 1.

At least two of the plies 61 of the reinforcement 6 have different geometries, in particular different lengths Pl and/or widths PL. Thus, the stacking of plies 61 allows to create a reinforcement 6 having a significant volume and a profile, that is to say a complex geometry with large variations in dimensions, in particular large variations in thickness over a reduced height. The reinforcement 6 can thus close the inner cavity 4 of the blade 1, in particular at an inner end 11 of the blade 1 located at the area of attachment of the blade 1 to a casing 101 of the turbomachine 100.

Finally, the stacking of plies 61 of the reinforcement 6 is simple and quick to manufacture. The plies 61 are in fact stacked by superimposing a ply 61 on a following adjacent ply 61.

The reinforcement 6 may have a rigidity greater than 15 (+/−5) GPa in the radial direction R of the blade 1. Thus, the reinforcement 6 contributes to the overall stiffness of the blade 1, to limit the risk of buckling and improve the frequency placement of the blading comprising the blade 1.

The volumetric rate of fibers of the reinforcement 6 is preferably comprised between 20% and 50%, for example between 30% and 45%, so as to ensure optimal mechanical properties of the reinforcement 6.

The reinforcement 6 may have dimensions corresponding substantially to dimensions of the inner cavity 4 of the blade 1 at the opening 5. Thus, the reinforcement 6 is arranged in the inner cavity 4 in such a way as to close the opening 5. The reinforcement 6 may have dimensions corresponding substantially to dimensions of the inner cavity 4 over an entire height of the reinforcement 6, the reinforcement 6 being arranged in a portion of the inner cavity 4 so as to at least partially fill said inner cavity 4. More particularly, the reinforcement 6 may comprise a root portion arranged in the root portion of the inner cavity 4 and a vane portion arranged in the vane portion of the inner cavity 4. The root portion of the reinforcement 6 may have dimensions corresponding substantially to the dimensions of the root portion of the inner cavity 4 so that the root portion of the reinforcement 6 completely closes the root portion of the inner cavity 4. The vane portion of the reinforcement 6 may have dimensions corresponding substantially to the dimensions of a portion of the vane portion of the inner cavity 4 so that the vane portion of the reinforcement 6 partially closes the vane portion of the inner cavity 4.

The reinforcement 6 may have a downwardly flared shape, that is to say an inverted funnel shape. Thus, a shape of the reinforcement 6 corresponds substantially to a shape of the inner cavity 4 of the blade 1 at the end portions of the blade 1 which diverge from each other in the thickness direction Y of the blade 1.

Each ply 61 of the stack of plies of the reinforcement 6 may comprise two opposite surfaces spaced apart from each other by the thickness Pe of ply 61 and each having a length corresponding to the length Pl of ply 61 and a width corresponding to the width PL of ply 61. A surface of a ply 61 is superposed on a surface of an adjacent ply 61 along the stacking direction De so as to form the stack. All the plies 61 of the set may have substantially the same thickness Pe.

Figure 4A:
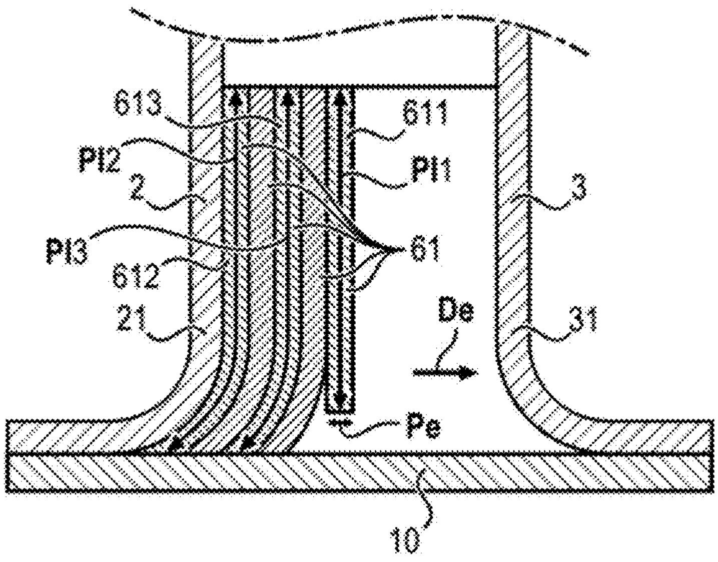
FIG. 4*a* illustrates a schematic radial cross-sectional view of an end portion of a blade comprising a reinforcement according to one embodiment, the reinforcement comprising plies stacked along a stacking direction De corresponding to a thickness direction of the blade.

In a first embodiment, illustrated as a non-limiting example in FIG. 4*a*, the stacking direction De corresponds to the thickness direction Y of the blade 1. The plies 61 are then stacked on top of each other in the thickness direction Y of the blade 1. A thickness direction Pe of a ply 61 corresponds to the thickness direction Y of the blade 1. A length direction Pl of a ply 61 may correspond to the height direction R of the blade 1, and a width direction PL of a ply 61 may correspond to the width direction L of the blade 1. Several plies 61 may have different lengths Pl. A stack of several plies 61 having different lengths Pl allows to form a reinforcement 6 adapted to match the shapes of an inner cavity 4 of a blade 1 which has a variable thickness, which is the case at the inner end portions 21 and 31 of the first outer skin 2 and of the second outer skin 3. This first embodiment is particularly advantageous in the case of a blade 1 for a secondary flow rectifier of a turbomachine 100, because it allows to improve the mechanical strength by minimizing the differences in stiffness and the coefficients of thermal expansion with the outer skins 2, 3 of the blade 1 between which the reinforcement 6 is intended to be inserted.

The stack of plies of the reinforcement 6 may comprise a first ply 611 having a first length Pl1 and a second ply 612 having a second length Pl2 strictly less than the first length Pl1. In the stack of plies 61, the second ply 612 may be arranged closer to a center of the reinforcement 6 than the first ply 611. Thus, the first ply 611 of the stack is located, when the reinforcement 6 is located in the inner cavity 4 of the blade 1, closer to one of the outer skins 2, 3 of the blade 1 than the second ply 612. For a given constant height of the reinforcement 6, the first ply 611, which has a greater length Pl1, may thus be curved close to the inner end 11 of the blade 1, so as to match a contour of the inner cavity 4 of the blade 1, the thickness of which increases close to the inner end 11 of the blade 1. The second ply 612 is less curved than the first ply 611, or may even remain straight, that is to say not curved.

The stack of plies of the reinforcement 6 may comprise a third ply 613 having a third length Pl3 strictly between the first length Pl1 and the second length Pl2. The third ply 613 is arranged between the first ply 611 and the second ply 612. In general, the stack of plies of the reinforcement 6 may comprise any number of plies 61 having different lengths, the plies 61 being arranged progressively according to their length Pl so that the closer the ply 61 is to the center of the reinforcement 6, the shorter its length Pl. In other words, when the reinforcement 6 is inserted into the inner cavity 4 of a blade 1, the closer the ply 61 is to an outer wall of the blade 1, the longer the length Pl of the ply 61. Thus, the folds of greater length are curved more than the folds of shorter length near the inner end 11 of the blade 1, the reinforcement 6 consequently having a downwardly flared shape adapted to match a shape of the inner cavity 4 of the blade 1 at the inner end 11 of the blade 1.

Figure 4B:
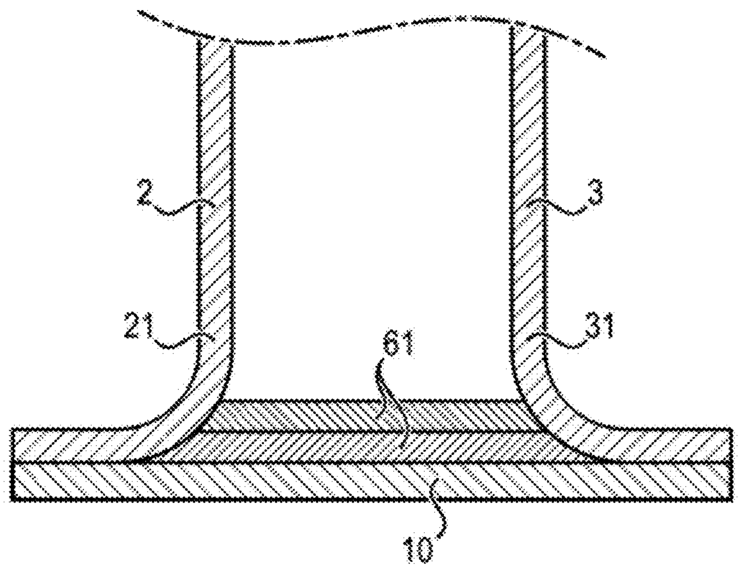
FIG. 4*b* illustrates a schematic radial cross-sectional view of an end portion of a blade comprising a reinforcement according to one embodiment, the reinforcement comprising plies stacked along a stacking direction De corresponding to a radial direction of the blade.

In a second embodiment, illustrated as a non-limiting example in FIG. 4*b*, the stacking direction De corresponds to the height direction R of the blade 1. The plies 61 are then stacked on top of each other in the height direction of the blade 1. A thickness direction Pe of a ply 61 corresponds to the height direction R of the blade 1. A length direction Pl of a ply 61 may correspond to the thickness direction Y of the blade 1, and a width direction PL of a ply 61 may correspond to the longitudinal direction L. Several plies 61 may have different lengths Pl. A stack of several plies 61 having different lengths Pl allows to form a reinforcement 6 adapted to match the shapes of an inner cavity 4 of a blade 1 which has a variable thickness, which is the case at the inner end portions 21, 31 of the first outer skin 2 and of the second outer skin 3. This second embodiment is particularly advantageous in the case of a blade 1 having a large variation in thickness, or having a large thickness, at the inner end portions 21, 31 of the skins 2, 3.

The stack of plies of the reinforcement 6 may comprise a first ply 611 having a first length Pl1 and a second ply 612 having a second length Pl2 strictly less than the first length Pl1. In the stack of plies 61, the first ply 611 is adapted to be arranged closer to the inner end 11 of the blade 1 than the second ply 612 when the reinforcement 6 is arranged in the inner cavity 4 of the blade 1. Thus, the first ply 611 of the stack is located, when the reinforcement 6 is located in the inner cavity 4 of the blade 1, closer to the opening 5 than the second ply 612. The reinforcement 6 can thus best match a contour of the inner cavity 4 of the blade 1, the thickness of which increases near the inner end 11 of the blade 1, the thickness of the cavity 4 being maximum at the opening 5.

The stack of plies of the reinforcement 6 may comprise a third ply 613 having a third length Pl3 strictly comprised between the first length Pl1 and the second length Pl2. The third ply 613 is arranged between the first ply 611 and the second ply 612. Generally, the stack of plies of the reinforcement 6 may comprise any number of plies 61 having different lengths, the plies 61 being arranged progressively according to their length Pl so that when the reinforcement 6 is arranged in the inner cavity 4, the closer the ply 61 is to the inner end 11 of the blade 1, the greater its length Pl. Thus, the reinforcement 6 has a downwardly flared shape adapted to match a shape of the inner cavity 4 of the blade 1 at the inner end 11 of the blade 1, the inner cavity 4 having a larger dimension which increases along the thickness direction Y near the inner end 11 of the blade 1.

Alternatively or additionally, in the first embodiment and/or in the second embodiment, several folds 61 may have different widths PL.

The reinforcement 6 is radially delimited by an inner edge and an outer edge opposite the inner edge. A distance, for example an average distance, between the inner edge and the outer edge of the reinforcement 6, corresponds to a height of the reinforcement 6. The inner edge of the reinforcement 6 can be arranged at the opening 5. The reinforcement 6 can extend between the inner edge and the outer edge over at least a portion of the height of the root 14 of the blade 1 and where appropriate over at least a portion of the height of the blade 1.

The height of the reinforcement 6 may be greater than 3% of the height of the blade 1, for example greater than 5% of the height of the blade 1, for example greater than 10% of the height of the blade 1. The height of the reinforcement 6 may be less than 50% of the height of the blade 1, for example less than 25% of the height of the blade 1, for example less than 15% of the height of the blade 1, for example less than 10% of the height of the blade 1. By way of non-limiting example, the height of the reinforcement 6 may be comprised between 5% and 15% of the height of the blade 1.

In a first embodiment, the reinforcement 6 extends below, that is to say in a position radially more internal than, the secondary flow line Fs delimiting the flow space of the secondary flow of the turbomachine 100. Thus, the reinforcement 6 extends in only a portion of the root 14 of the blade 1. The stiffness of the blade 1 is therefore increased at the root 14 of the blade 1 and the mass impact due to the presence of the reinforcement 6 on the blade 1 is limited. For example, the height of the reinforcement 6 may be less than 50 mm. The height of the reinforcement 6 may be less than approximately 10% of the height of the blade 1, or even less than approximately 5% of the height of the blade 1, or even less than approximately 3% of the height of the blade 1.

In a second embodiment, the reinforcement 6 extends in a portion of the root 14 of the blade 1 and in a portion of the vane 13. An upstream end of the outer edge of the reinforcement 6, that is to say an end of the reinforcement located on the leading edge 8 side of the blade 1, extends above, that is to say in a position radially more external than, the secondary flow line Fs at the leading edge 8 of the blade 1. A downstream end of the outer edge of the reinforcement 6, that is to say an end of the reinforcement located on the trailing edge 9 side of the blade 1, extends below, that is to say in a position radially more internal than, the secondary flow line Fs at the trailing edge 9 of the blade 1. Thus, the stiffness of the blade 1 is increased at the root 14 of the blade 1 and at the leading edge 8 of the blade 1, where a large portion of the stresses are located, while limiting the mass impact on the blade 1 comprising the reinforcement 6. For example, the height of the reinforcement 6 can be comprised between 50 mm and 100 mm. The height of the reinforcement 6 can be comprised between approximately 3% and approximately 20% of the height of the blade 1, for example be comprised between approximately 10% and approximately 15% of the height of the blade 1.

In a third embodiment, the reinforcement 6 extends in the root 14 of the blade 1 and in at least a portion of the vane 13 of the blade 1, an outer edge of the reinforcement 6 extending radially above, that is to say in a position radially more external than, the secondary flow line Fs. Thus, the reinforcement 6 extends in the root 14 of the blade 1 over the entire height of the root 14 of the blade 1, and further extends in the vane 13 of the blade 1, over at least a portion of the height of the vane 13, or even over substantially the entire height of the vane 13. Thus, the stiffness of the blade 1 is further increased, both at the root 14 of the blade 1 and at the leading edge 8 and the trailing edge 9 of the vane 13. For example, the height of the reinforcement 6 may be greater than 100 mm. The height of the reinforcement 6 may be greater than approximately 5% of the height of the blade 1, or even greater than approximately 10% of the height of the blade 1, or even greater than approximately 20% of the height of the blade 1, or even greater than approximately 50% of the height of the blade 1.

Filling Material

The blade 1 may further comprise a filling material 41 arranged in the inner cavity 4 radially between the reinforcement 6 and the outer end 12 of the blade 1. The filling material 41 thus extends radially above the reinforcement 6, that is to say in a position radially more external than the reinforcement 6, at a distance from the opening 5. The filling material 41 may be arranged against the reinforcement 6, that is to say in contact with the outer edge of the reinforcement 6.

The filling material 41 may have a density lower than a density of the reinforcement 6 and/or lower than a density of the composite material of the outer skins 2, 3, the filling material 41 being inserted into a hollow area of the blade 1 which is not a structural area and therefore does not need to be reinforced. The filling material 41 may have, for example, a density of the order of a hundred kg/$m^3$ and a stiffness of the order of a hundred MPa. The filling material 41 may be integrated into one or more filling parts, each filling part being adapted to be arranged in the inner cavity 4 of the blade 1.

The filling material 41 may for example be a foam, such as a foam of organic (polyethacrylimide, polyethylene terephthalate (PET), polyvinyl chloride (PVC), polyetherimide (PEI), polyvinyl, carbon, polyisocyanurate, polyurethane, etc.) or metallic origin (in particular aluminum alloy), or else a honeycomb of the Nomex® type (comprising aramid fibers calendered into sheets and covered with phenolic resin), Kevlar, glass fibers or else aluminum.

The filler material 41 may be arranged only in the vane portion of the inner cavity 4, in particular when the reinforcement 6 extends throughout the root portion of the inner cavity 4 and in a portion of the vane portion of the inner cavity 4. The filler material 41 may extend in only a portion of the vane portion of the inner cavity 4, or in only the entire vane portion of the inner cavity 4, in particular when the reinforcement 6 extends in only a portion of the root portion of the inner cavity 4. The filler material 41 allows to stiffen the outer skins 2, 3 and/or to give the outer skins 2, 3 the final shape of the vane 13, with minimal impact on the mass of the blade 1.

Method for Manufacturing the Reinforcement

A method for manufacturing a reinforcement 6 as described above for a blade 1 of a turbomachine 100 as described above comprises the following steps:

E1: Cutting a set of plies 61 in a carbon mat, each ply 61 having a length Pl, a width PL and a thickness Pe, at least two of the plies 61 of the set having different lengths Pl and/or widths PL;

E3: Stacking the plies 61 of the set by superimposing a ply 61 on an adjacent ply 61 along a thickness direction Pe of the plies 61, so as to create a stack having a profile of variable dimensions; and E4: Compacting the stack of plies 61.

The method described below generally has the same advantages as those described concerning the reinforcement 6 described above. In particular, the method allows to quickly create a reinforcement 6 having a complex geometry.

Furthermore, reinforcement 6 is made from a carbon mat, which allows to produce a rigid part with complex geometry.

The carbon mat is in the form of a rectangular support, where appropriate rolled into a roll, having a certain thickness. Thus, the carbon mat can be a roll formed by a strip of non-woven fibers, for example a strip of non-woven carbon fibers, comprising a small proportion of a polymer, for example a thermostatic or thermosetting polymer, acting as a binder. The fibers are mixed with the binder, calendering being carried out where appropriate up to a temperature greater than or equal to the glass transition temperature of the binder material. The binder ensures the cohesion of the fibers and the holding of the strip. The carbon mat can be a recycled product manufactured from carbon fiber scraps. The thickness Pe of a ply 61 can correspond to the thickness of the carbon mat.

Step E1 of cutting plies 61 in the carbon mat may correspond to cutting with scissors. However, such cutting with scissors is very long. Alternatively, step E1 of cutting plies 61 in the carbon mat may correspond to cutting with water jets. Such cutting with water jets allows to facilitate the manufacture of the reinforcement 6 and to lighten the target manufacturing range and to obtain a clean, non-heating and repeatable cut of the mat, without degrading the fiber, in order to be able to drape plies 61 of carbon mat subsequently.

The set of plies 61 cut in step E1 can then be prepared for use in a clean room. The step E3 of stacking the plies 61 of the set is carried out in a clean room. The stacking step E3 allows to obtain a reinforcement 6 whose dimensions correspond substantially to the dimensions of the inner cavity 4 of the blade 1 located between the two composite skins 2, 3, that is to say to obtain a reinforcement 6 which can have large variations in thickness.

The plies 61 may be stacked during step E3 in a forming mold. The forming mold may be a single forming mold having a counterform relative to the reinforcement 6 to be created. The plies 61 are then superposed directly in the forming mold, to fill the forming mold so as to create the reinforcement 6 having the desired geometry. Alternatively, the forming mold may consist of two forming half-molds, each having a counterform corresponding substantially to one half of the shape of the reinforcement 6 to be created. A first portion of the plies 61 of the assembly are stacked on top of each other in a first forming half-mold, and a second portion of the plies 61 of the set are stacked on top of each other in a second forming half-mold. The first forming half-mold forms a wedge on which a first ply 61 is arranged, a second adjacent ply 61 being superposed on the first, and so on for all the plies 61 of the first portion of the set. In the same way, the second forming half-mold forms a wedge on which a first ply 61 is arranged, a second adjacent ply 61 being superposed on the first, and so on for all the plies 61 of the second portion of the set. One of the first and second forming half-molds is then turned over and aligned relative to the other, the two forming half-molds being arranged opposite each other. Then, the two forming half-molds are assembled to form a complete forming mold having a counterform relative to the reinforcement 6 to be created.

The compacting step E4 allows to compact the stack of plies 61 to obtain the desired final dimensions of the reinforcement 6 and ensure the cohesion of the plies 61 of the stack. The mold is tightened, for example under pressure. The folds 61 can be compacted during step E4 in the forming mold.

The method for manufacturing the reinforcement 6 may further comprise the following steps:

E2: Humidifying the plies 61 after the cutting step E1 and before the stacking step E3; and E5: Drying the stack of plies 61 compacted during step E4.

The step E2 of humidifying the plies 61 allows to soften the carbon mat decouples and thereby to facilitate the shaping and compacting of the plies 61 once stacked, allowing to obtain lower fiber-to-fiber friction.

The drying step E5 allows the water added during the humidification step to be removed. Drying allows the plies 61 stacked together to be shaped and bonded together so that the stack of plies 61 holds together. Thus, drying allows the fibers to be given cohesion therebetween, which allows for a rigid reinforcement 6, thus stiffening the preform of the blade 1 as best as possible.

The compacted 61 stack of plies can be mounted for drying, the mounting may include a vacuum tarpaulin, valves, felt, etc. Drying can be carried out in an oven or autoclave.

The compacted stack of plies 61 may be placed in a drying mold, or alternatively the drying mold may correspond to the forming mold used for stacking the plies 61 during step E3 and for compacting the plies 61 during step E4.

The drying step E5 may be carried out for a duration of approximately 6 hours and at a temperature of approximately 100° C. to 120° C. Alternatively, drying step E6 may be carried out for a duration of approximately 12 hours and at a temperature of approximately 100° C. to 120° C. The cycle of drying step E5 may be adapted according to the nature of the binder and the ventilation required to evacuate the water introduced during the humidification step.

The method may further comprise a step E6 of demolding the compacted, if necessary dried, stack of plies 61. The demolding may be carried out cold, that is to say at room temperature, so that the enzyme which is in the fibers is well stiffened.

Method for Manufacturing the Blade

Figure 7:
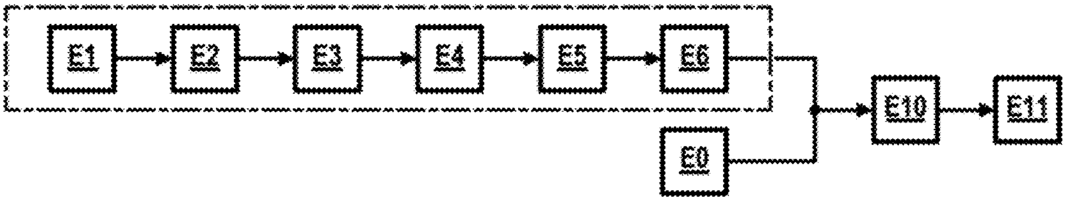
FIG. 7 is a block diagram illustrating a method for manufacturing a blade according to one embodiment.

A blade 1 as described above can be obtained using the manufacturing method which follows, and which is illustrated as a non-limiting example in FIG. 7. This is not, however, limiting, other methods being able to be considered for the production of such a blade 1. The method for manufacturing the blade 1 can comprise the following steps:

- Producing a composite preform of the composite blade 1 during a step E0, said preform comprising a first outer skin 2 and a second outer skin 3 which are made of composite material connected to each other at an outer end 12 of the blade 1, the first skin 2 comprising a first inner end portion 21, the second skin 3 comprising a second inner end portion 31, the first inner end portion 21 and the second inner end portion 31 being spaced apart from each other in such a way as to delimit therebetween an inner cavity 4 of the blade 1 that opens into an opening 5 at an inner end 11 of the blade 1, the inner end 11 being radially opposite the outer end 12;
- Manufacturing a reinforcement 6 by means of a method for manufacturing a reinforcement 6 as described above, the reinforcement 6 having dimensions substantially the same as the dimensions of the inner cavity 4 at the opening 5;
- Placing the reinforcement 6 in the inner cavity 4 of the blade preform 1 in such a way as to close the opening 5; and
- Injecting resin into the assembly comprising the blade preform 1 and the reinforcement 6 during a step E11.

This method allows the reinforcement 6 to be injected at the same time as the rest of the blade 1. Thus, the reinforcement 6 is bonded to the skins 2, 3 of the blade 1 without the use of glue or surface treatment. Furthermore, the reinforcement 6 ensures good compaction of the skins 2, 3 of the blade 1 in the radii during shaping, ensuring the desired fiber volume ratio in the radii.

The fiber preform of the blade 1 can be produced during step E0 for example by three-dimensional weaving or knitting. In an exemplary embodiment, the fiber blank is woven in three dimensions with the production of a disconnection in order to obtain the two skins 2, 3 and the inner cavity 4, as described above concerning the blade 1. The two skins 2, 3 are monolithic at the head 12 of the blade 1, the leading edge 8 and the trailing edge 9 of the vane 13. The inner cavity 4 is open at the root 14 of the blade 1 and extends into the vane 13.

The manufacture of the preform of the blade 1 may comprise a step of cutting surface threads of the woven preform ("Trimming"), in particular when threads of the preform remain non-woven and protrude.

A filling material 41 may be placed in the inner cavity 4, following the placement of the reinforcement 6 in the inner cavity 4 or prior to this placement.

During step E10, the reinforcement 6 can be placed in the inner cavity 4, for example, pressing against the filling material 41. The reinforcement 6 closes the inner cavity 4 of the blade 1 at the opening 5.

The assembly formed by the fibrous preform, the filling material 41 and the reinforcement 6 can then be placed in an injection mold. The injection mold can have a counterform of dimensions corresponding substantially to the dimensions of the final molded blade 1, namely the desired vane 13 and root 14 of the blade 1. The mold is then closed, for example by a wall which closes the opening 5, in order to carry out the injection.

The resin injected during step E11, which forms the "matrix" of the composite material, is a generally plastic material. The resin is injected into the injection mold so as to impregnate the fibrous reinforcement of the skins 2, 3, the filling material 41 and the reinforcement 6.

The injection of the matrix can be carried out by an injection technique of the RTM or VARRTM type. In the case of a plastic material, the injected matrix is for example a thermosetting liquid composition containing an organic precursor of the matrix material. The organic precursor is usually in the form of a polymer, such as a resin, possibly diluted in a solvent. In a manner known per se, the plastic material is then heated so as to cause its polymerization, for example by crosslinking. For this purpose, the injection mold is placed in an oven. The part obtained can then be demolded from the injection mold.

Optionally, a leading edge 8 can be inserted into the upstream portion of the preform of the blade 1. An outer layer forming the leading edge 8 is then placed on the preform to achieve the pairing of the leading edge 8. Then, the leading edge 8 is passed through the autoclave to be bonded to the preform.

Then, one or more steps of various finishing and/or completions can be carried out. For example, the demolded part can be cutout by machining to remove excess lengths and obtain a part having the desired shape, despite possible shrinkage of the fibers of the fibrous reinforcement during polymerization of the plastic material. The sacrificial thicknesses are in particular machined to obtain the reference surfaces of the root 14 of the blade 1. Through passages are also machined in the skins 2, 3 to receive the fixing system. Where appropriate, counterbores are also machined around the through passages.

The invention claimed is:

1. A blade of a turbomachine comprising:

a first outer skin and a second outer skin which are made of composite material connected to each other at an outer end of the blade, the first skin comprising a first inner end portion, the second skin comprising a second inner end portion, the first inner end portion and the second inner end portion being spaced apart from each other in such a way as to delimit therebetween an inner cavity of the blade that opens into an opening at an inner end of the blade, the inner end being radially opposite the outer end, the first skin and the second skin together form the outermost layer of the blade, and reinforcement arranged in the inner cavity in such a way as to close the opening, and wherein the reinforcement comprises a stack of plies, each ply having a length, a width and a thickness, a ply being superposed on an adjacent ply along a stacking direction corresponding to a thickness direction of the plies, at least two of the plies of the stack having different lengths and/or widths such that the reinforcement has a profile of variable dimensions, the reinforcement having a rigidity greater than 10 GPa in a radial direction of the blade.

2. The blade according to claim 1, wherein the stack of plies of the reinforcement comprises a first ply having a first length and a second ply having a second length strictly less than the first length, and wherein:

the second ply is arranged closer to a center of the reinforcement than the first ply, the stacking direction being adapted to correspond to a thickness direction of the blade, or wherein the first ply is adapted to be arranged closer to the inner end of the blade than the second ply when the reinforcement is arranged in the inner cavity of the blade, the stacking direction being adapted to correspond to a height direction of the blade.

3. The blade according to claim 1, comprising an aerodynamically profiled vane suitable for being placed in an airflow when the turbomachine is operating in order to generate lift, and a root configured to be fixed to the hub of a blading comprising the blade at the inner end of the blade, wherein the first inner end portion and the second inner end portion are adapted to together define outer walls of the root and of at least a portion of the vane of the blade, such that the inner cavity comprises a root portion and a vane portion, and wherein the reinforcement comprises a root portion arranged in the root portion of the inner cavity and a vane portion arranged in the vane portion of the inner cavity.

4. The blade according to claim 1, further comprising a filler material arranged in the inner cavity radially between the reinforcement and the outer end of the blade.

5. An unducted turbomachine, comprising:

a casing;

a fan having a fan hub and peripheral fan vanes, integral with the fan hub, the fan hub having a downstream hub portion which is surrounded by an inner surface of an upstream portion of the casing and which protrudes from the upstream portion of the casing, the fan hub being rotatably mounted relative to the upstream portion of the casing about a longitudinal axis of the unducted turbomachine; and at least one blade according to claim 1, the blade being a rectifier blade and being located downstream relative to the peripheral vanes of the fan, the blade being mounted on an outer surface of the upstream portion of the casing at an inner end of the blade, the reinforcement being arranged at the inner end of the blade.

6. A method for manufacturing the blade according to claim 1, comprising the following steps:

E1: Cutting a set of plies in a carbon mat, each ply having a length, a width and a thickness, at least two of the plies of the set having different lengths and/or widths;

E3: Stacking the plies of the set by superimposing a ply on an adjacent ply along a thickness direction of the plies, so as to create a stack having a profile of variable dimensions; and E4: Compacting the stack of plies in order to obtain the reinforcement of the blade.

7. The manufacturing method according to claim 6, further comprising the following steps:

E2: Humidifying the plies after the cutting step E1 and before the stacking step E3; and E5: Drying the stack of plies compacted during step E4.

8. The manufacturing method according to claim 6, wherein the plies are stacked during step E3 in a forming mold, the plies are compacted during step E4 in the forming mold, and wherein the method further comprises a step E6 of cold demolding the compacted stack of plies.

9. A method for manufacturing the blade of claim 1, comprising the following steps:

Producing a composite preform of the composite blade, the composite preform comprising a first outer skin and a second outer skin which are made of composite material connected to each other at an outer end of the blade, the first skin comprising a first inner end portion, the second skin comprising a second inner end portion, the first inner end portion and the second inner end portion being spaced apart from each other in such a way as to delimit therebetween an inner cavity of the blade that opens into an opening at an inner end of the blade, the inner end being radially opposite the outer end;

Manufacturing the blade by means of a method comprising the following steps:

E1: Cutting a set of plies in a carbon mat, each ply having a length, a width and a thickness, at least two of the plies of the set having different lengths and/or widths;

E3: Stacking the plies of the set by superimposing a ply on an adjacent ply along a thickness direction of the plies, so as to create a stack having a profile of variable dimensions; and E4: Compacting the stack of plies in order to obtain the reinforcement of the blade such that the reinforcement has dimensions substantially the same as the dimensions of the inner cavity at the opening;

Placing the reinforcement in the inner cavity of the blade preform in such a way as to close the opening; and Injecting resin into the assembly comprising the blade preform and the reinforcement.

10. The blade according to claim 1, wherein the plies are stacked so that at least a portion of each ply extends in a direction parallel to a longitudinal axis of the blade, or at least a portion of each ply extends in a direction perpendicular to the longitudinal axis of the blade.

11. The blade according to claim 1, comprising an aerodynamically profiled vane suitable for being placed in an airflow when the turbomachine is operating in order to generate lift, and a root configured to be fixed to a rotating or fixed hub of the blading comprising the blade at the inner end of the blade, wherein the first skin forms a pressure side wall of the vane and the second skin forms a suction side wall of the vane.

12. The blade according to claim 1, wherein the first skin and the second skin both extend from the inner end to the outer end according to a continuous curvature.

13. The blade according to claim 1, wherein the first skin and the second skin are made of a composite material comprising a fibrous reinforcement densified by a matrix, the fibrous reinforcement comprising woven or knitted three-dimensional fibrous arrangements, or laminated two-dimensional fibrous arrangements.

14. The blade according to claim 13, wherein the volumetric rate of fiber of the reinforcement is comprised between 20% and 50%.

15. The blade according to claim 1, wherein the plies are cut in a carbon mat made of non-woven carbon fibers mixed with a binder.

16. The blade according to claim 15, wherein the binder is a polymer.

17. The blade according to claim 1, being a blade of a turbomachine fan.

18. The blade according to claim 1, wherein each ply of the stack of plies comprises at least a portion extending in a direction which is perpendicular to the stacking direction, said direction being identical for all the plies of the stack.

* * * * *